United States Patent
Sinclair et al.

(10) Patent No.: US 8,200,570 B2
(45) Date of Patent: Jun. 12, 2012

(54) ELECTRONIC TRADING SYSTEM HAVING INCREASED LIQUIDITY PROVISION

(75) Inventors: James Sinclair, New York, NY (US); James O'Hagan, Englishtown, NJ (US); Edward Howorka, Morris Plains, NJ (US); Neena Jain, South Plainfield, NJ (US)

(73) Assignee: EBS Group Limited, London (GB)

( * ) Notice: Subject to any disclaimer, the term of this patent is extended or adjusted under 35 U.S.C. 154(b) by 407 days.

(21) Appl. No.: 12/436,259

(22) Filed: May 6, 2009

(65) Prior Publication Data

US 2009/0281911 A1 Nov. 12, 2009

Related U.S. Application Data

(62) Division of application No. 10/694,758, filed on Oct. 29, 2003, now Pat. No. 7,925,569.

(60) Provisional application No. 60/421,792, filed on Oct. 29, 2002.

(51) Int. Cl.
G06Q 40/00 (2006.01)
(52) U.S. Cl. ......................................... 705/37
(58) Field of Classification Search .................. 705/37
See application file for complete search history.

(56) References Cited

U.S. PATENT DOCUMENTS

| | | | |
|---|---|---|---|
| 5,375,055 A * | 12/1994 | Togher et al. ............... | 705/37 |
| 6,014,627 A | 1/2000 | Togher et al. | |
| 6,321,202 B1 | 11/2001 | Raveis, Jr. | |
| 6,519,574 B1 * | 2/2003 | Wilton et al. ............... | 705/35 |
| 6,584,451 B1 | 6/2003 | Shoham et al. | |
| 6,594,633 B1 | 7/2003 | Broerman | |
| 6,807,635 B1 | 10/2004 | Kleckner | |
| 7,110,972 B1 | 9/2006 | Handa et al. ............... | 705/37 |
| 7,310,616 B2 * | 12/2007 | Sugahara ................ | 705/37 |
| 2001/0005829 A1 | 6/2001 | Raveis, Jr. | |
| 2001/0037230 A1 | 11/2001 | Raveis, Jr. | |
| 2001/0047282 A1 | 11/2001 | Raveis, Jr. | |
| 2002/0002545 A1 | 1/2002 | Resneck | |
| 2002/0007334 A1 | 1/2002 | Dicks et al. | |
| 2002/0023030 A1 | 2/2002 | Prohaska et al. | |
| 2002/0023033 A1 | 2/2002 | Campbell et al. | |
| 2002/0032579 A1 * | 3/2002 | Harpale ..................... | 705/1 |
| 2002/0046159 A1 | 4/2002 | Raveis, Jr. | |
| 2002/0049624 A1 | 4/2002 | Raveis, Jr. | |
| 2002/0052824 A1 * | 5/2002 | Mahanti et al. ............. | 705/37 |
| 2002/0069176 A1 | 6/2002 | Newman | |
| 2002/0083015 A1 | 6/2002 | Yoshifuku et al. | |

(Continued)

FOREIGN PATENT DOCUMENTS

EP 0 399 850 A2 11/1990

(Continued)

*Primary Examiner* — Jessica Lemieux
(74) *Attorney, Agent, or Firm* — Dickstein Shapiro LLP

(57) ABSTRACT

An anonymous trading system includes a prime broker facility that allows a third party to trade on behalf of an institution. A deal is executed between the third party and a counter-party and a further deal is then executed between the third party and the party on whose behalf it has traded. The second deal may be for the same amount as the first deal or may be altered to include the third party's fee for conducting the first deal. Clients of the third party have prices available to them for trades made via the third party which are displayed at their trader terminals. The client sees that a better price is available though the third party than by dealing direct and selects to conduct a deal through the third party.

2 Claims, 12 Drawing Sheets

U.S. PATENT DOCUMENTS

| | | |
|---|---|---|
| 2002/0087452 A1 | 7/2002 | Megiddo |
| 2002/0091624 A1 | 7/2002 | Glodjo et al. |
| 2002/0099633 A1 | 7/2002 | Bray .......................... 705/35 |
| 2002/0099647 A1 | 7/2002 | Howorka et al. |
| 2002/0103667 A1 | 8/2002 | Jannah et al. |
| 2002/0116332 A1 | 8/2002 | Sanchez |
| 2002/0133455 A1 | 9/2002 | Howorka et al. .............. 705/37 |
| 2002/0138400 A1 | 9/2002 | Kitchen et al. |
| 2002/0152153 A1 | 10/2002 | Nakagawa |
| 2002/0152156 A1 | 10/2002 | Tyson-Quah |
| 2002/0184135 A1 | 12/2002 | Zakaria |
| 2002/0188553 A1 | 12/2002 | Blauvelt et al. |
| 2003/0018561 A1 | 1/2003 | Kitchen et al. |
| 2003/0033240 A1 | 2/2003 | Balson et al. ................. 705/37 |
| 2003/0055772 A1 | 3/2003 | Goldstein |
| 2003/0055776 A1* | 3/2003 | Samuelson .................... 705/37 |
| 2003/0061147 A1 | 3/2003 | Fluhr et al. |
| 2003/0069836 A1 | 4/2003 | Penney et al. |
| 2003/0074273 A1 | 4/2003 | Miller et al. |
| 2003/0083973 A1* | 5/2003 | Horsfall ........................ 705/37 |
| 2003/0084001 A1 | 5/2003 | Chang |
| 2003/0088509 A1 | 5/2003 | Wilton et al. |
| 2003/0139996 A1 | 7/2003 | D'Antoni et al. |
| 2003/0149653 A1 | 8/2003 | Penney et al. |
| 2003/0149654 A1 | 8/2003 | Harrington et al. |
| 2003/0154171 A1 | 8/2003 | Karp et al. |
| 2003/0163413 A1 | 8/2003 | Wiczkowski |
| 2004/0001580 A1 | 1/2004 | Mason .................... 379/207.04 |
| 2004/0133506 A1 | 7/2004 | Glodjo et al. |
| 2006/0259391 A1* | 11/2006 | Schoen et al. ................. 705/37 |

FOREIGN PATENT DOCUMENTS

| | | |
|---|---|---|
| GB | 2 363 876 A | 1/2002 |
| WO | WO-01/75658 | 10/2001 |
| WO | WO-01/75751 | 10/2001 |
| WO | WO-01/75752 | 10/2001 |
| WO | WO-01/75753 | 10/2001 |
| WO | WO-02/39401 | 5/2002 |
| WO | WO-02/086660 | 10/2002 |
| WO | WO-02/093294 | 11/2002 |
| WO | WO-03/023564 | 3/2003 |
| WO | WO 03/058488 A1 | 7/2003 |
| WO | WO-03/073302 | 9/2003 |
| WO | WO-2004/044811 | 5/2004 |
| WO | WO 2004/001533 A2 | 12/2004 |

* cited by examiner

ELECTRONIC TRADING SYSTEM HAVING INCREASED LIQUIDITY PROVISION

CROSS-REFERENCE TO RELATED APPLICATION

This application is a divisional of U.S. application Ser. No. 10/694,758, filed Oct. 29, 2003, which claims benefit of U.S. Provisional Application No. 60/421,792, filed Oct. 29, 2002, each of which is hereby incorporated by reference.

FIELD OF THE INVENTION

This invention relates to trading systems for trading fungibles such as, but not limited to, financial instruments. It is particularly, but not exclusively, concerned with anonymous trading systems where the identity of counterparties to deal is not known until the deal is completed. It is also concerned with increasing the liquidity in the market of instruments that are being traded on trading system.

BACKGROUND TO THE INVENTION

In the following discussion, the invention is disclosed with respect to a particular financial instrument, FX spot, traded on an anonymous trading system. It is to be understood that the invention is applicable to any trading system in which credit is assigned by at least one party to possible deals with one or more counterparties, and to the trading of any fungible. The fungible may be an instrument such as a financial instrument but could also be any other type of fungible such as a commodity for example metals, energy, foodstuffs etc. The invention is also applicable to any financial instrument including, but not limited to, FX products such as, but not limited to, Spot, forwards, outrights, FRA's and futures and other non-FX products such as equity products.

The term fungible used herein means any product that is capable of being traded.

Anonymous trading systems are well known and have been used to trade financial instruments such as Foreign Exchange (FX) Spot for a number of years. Examples of anonymous trading systems are disclosed in U.S. Pat. No. 5,375,055 and EP-A-0399850. In each of these systems, part of a trading book is distributed to a trader's workstation. Traders submit quotes to the system anonymously which quotes are matched by a matching engine to execute deals after credit limits have been checked. In an anonymous trading system, traders are presented with quotes that have been entered into the market by counter-parties. The trader can attempt to deal with these quotes but does not know the identity of the counter-party with whom he is dealing. This identity is only given up when the deal has been completed. As the identity of the counter-party is unknown, the trader's financial institution assigns credit limits to trades with all possible counter-parties trading on the system. Credit limits limit the institution's exposure should the counter-party default on a deal and are an indication of the risk represented by trading with each counter-party. U.S. Pat. No. 5,375,055 discloses the concept of screening quotes input into the system and only displaying to a given user those quotes with which they have credit to trade. This avoids the possibility of a trader trying to trade a quote only to find that the deal is refused through lack of credit. In a fast moving volatile market this can cause a trader to lose a trading opportunity.

Interbank anonymous trading systems have been very successful. However they are largely limited to major banks. Smaller banks have limited access to the systems as they are not allocated sufficient credit by the major banks to 'see' the best prices. One reason for this is the risk perceived by the larger banks of trading large amounts with smaller, less credit worthy, banks. Because a smaller bank does not have any or much credit with many of the counter-parties on the system, and because undealable quotes are hidden, a smaller bank has only a limited subset of quotes with which it can trade. The quotes are often not the best prices in the system. As a result, the smaller banks are at a disadvantage and tend not to use the systems, preferring to trade through other channels such as direct dealing systems or conventional voice brokers. This is undesirable from the point of view of the smaller banks as they are not getting the best deals available. It is also undesirable from the point of view of the trading system operator as the potential liquidity of the system is reduced. Liquidity is a measure of the number of quotes in the system and must reach a certain level before the system becomes a viable trading forum. The loss of smaller banks in the more common currency pair markets such as USD:JPY (United States Dollar to Japanese Yen) is not critical to the operation of these markets but it is more important in less liquid markets, for example USD:AUD (United States Dollar to Australian Dollar).

SUMMARY OF THE INVENTION

There is a need therefore to address the problem of allowing smaller institutions to trade on a system in which they have limited credit with many of the counter-parties, without being forced to accept poor prices. The present invention aims to address that need.

According to the invention there is provided a method of trading instruments on a trading system in which a plurality of counter-parties trade with each other comprising the steps of: displaying to a first party a quote having the best price in the market for which a third party has credit to deal; initiating by the first party a trade at the best price, wherein the trade is conducted by executing a first deal between the third party and the counter-party owning the best price quote; and executing a second deal between the third party and the first party, the amount of the second deal being the same as the amount of the first deal.

The invention also provides a method of executing trades on a trading system comprising a plurality of counter-parties, comprising: displaying to a first trading party on the system the best price available by trading through a third party; executing a first deal between the third party and the party offering the best price; and executing a second deal between the third party and the first trading party for the same amount as the amount of the first deal.

The invention also provides a trading system for trading fungibles between counter-parties, the trading system comprising: a matching engine for matching quotes for execution of deals; a plurality of trading floors for receiving price information relating to quotes submitted by counterparties with whom the trading floors have credit; the price information communicated to at least one trading floor including the best price in the market for which a third party has credit to deal; a trade initiator at a first party trading floor for initiating a trade at the best price, the trade being conducted by executing a first deal between the third party and the counter-party owning the best price quote; and wherein the third party comprises software for executing said first deal and executing a second deal between the third party and the first party, the amount of the second deal being the same as the amount of the first deal.

The invention further provides a system for executing trades on a trading system comprising a plurality of counter-parties, comprising: software for executing a first deal between a third party and a party offering the best price, the third party trading on behalf of a first party; and software for executing a second deal between the third party and the first trading party for the same amount as the amount of the first deal.

In a preferred embodiment of the invention, an institution trading on an anonymous trading system may act as a prime broker, conducting trades on behalf of parties who have no credit with a party who is offering the best price in the market. Institutions who are willing to trade via a prime broker are shown the best price that is available to them. If they do not have credit with the owner of that price, a trade will be conducted on their behalf by the prime broker. A second trade is then conducted for the same amount between themselves and the prime broker. The price at which the second trade or deal is executed may be the same as that of the first deal or it may be adjusted to incorporate the prime broker's fee. Preferably the prime broker is assigned a deal code unique to trades conducted on behalf of clients. The other side to these trades, and other traders on the trading system, will not be aware of the identity of the party on whose behalf the prime broker is trading.

Prime broker trades are initiated by a trader at the client institution. The trader may have a single workstation that gives him the option of trading on behalf of his institution or via a prime broker. Alternatively he may have a dedicated terminal or workstation for prime broker trades. Such a terminal might be owned by the prime broker. However, trades conducted via that terminal are initiated by the client institution.

In one preferred embodiment, the party on whose behalf the prime broker trades is a hedge fund. The hedge fund comprises a plurality of funds and enters the list of funds into the trading system, and provides them to the prime broker who maps them onto existing codes for those parties. The hedge fund, on receipt of a deal ticket breaks the completed deal down into a plurality of deals related to the plurality of hedge funds. The deal ticket may include information enabling the deal to be broken down.

In one preferred embodiment, the prime broker customer may itself execute a further deal for the same amount with one of its own customers. This deal may be at the same price as the deal it concluded with the prime broker or may be weighted to include a transaction fee.

Multiple prime brokers may be available to a given party. The party may include a display of the prices available from each of a plurality of prime brokers or just the best prime broker price available. Alternatively, the price shown may be a blend of the best prime broker price and the best price available by direct dealing.

Preferably, credit between a prime broker and its customer is netted, so that credit is adjusted following a deal made by the prime broker on behalf of a customer in the opposite direction for a buy trade than for a sell trade.

Preferably, the matching rules run by the matching engine follow a price, time priority unless the prime broker, trading on its own behalf has a more recent quote in the market at the same price. In this case the prime broker quote is matched in preference to the earlier quote.

Preferably, each of the prime broker and its customers may see the quotes submitted via the prime broker, for example via a deal panel. Each of the customer and the prime broker may grant permission to the other governing viewing of the quotes.

Embodiments of the invention are advantageous to the prime brokers, their clients and to the operator of the anonymous trading system. The clients are typically smaller institutions who do not have credit with many of the parties trading on the system. This means that they are unable to deal many of the best prices. As the system only shows them prices that they can deal, they will only be aware of the best prices from outside the trading system. Embodiments of the invention give these client institutions or customers access to better prices by relying on the credit extended to the prime broker, which is typically a larger institution. Clients have an increased probability of their orders being executed and tighter prices to quote their own customers.

To the prime broker, embodiments of the invention have the advantage of access to a greater number of counter-parties for cross-selling, increased market exposure and increased market flow as well as increased revenue.

Embodiments of the invention are advantageous to the operator of the anonymous trading system as they increase the liquidity in the market for the instrument or instruments being traded on the system. This facilitates trades and leads to increased revenue which is typically generated on a per trade basis.

Embodiments of the invention will now be described, by way of example only, and with reference to the accompanying drawings, in which:

DESCRIPTION OF PREFERRED EMBODIMENTS

In the embodiment to be described, a larger institution allows a smaller institution having limited credit to utilise the larger institution's credit. The smaller institution gets the benefit of seeing quotes which it cannot ordinarily deal and so can execute deals at better prices. In return the larger institution charges the smaller institution for the use of its credit. The trading system's operator benefits from an increase in trades, from additional subscribers to the system, and from an increase in liquidity which can make less common currency pairs viable. All these benefits increase the operator's revenues from the system.

In the embodiment to be described, the larger institution assigns a deal code to deals executed by clients using its credit. This deal code is separate from the code used for its own deals. As soon as such a deal on the third party deal code has been concluded with a counter-party, a further deal is concluded between the larger bank and its client. This further deal may be an exact mirror of the first deal or may be adjusted, for example, by changing the buy/sell price, to take into account the larger bank's fee for the first deal. The counter-party to the first deal is not aware of the identity of the client bank and is only aware that it has concluded a trade with the larger bank. The larger bank acting in this manner is referred to as a prime broker. However, the counterparty may, in a preferred embodiment, see that the deal was concluded with a prime broker deal code at the larger bank. Thus the counterparty knows that a third party was involved but does not know the identity of that third party. By using a separate deal code for prime broker deals, a virtual trading floor is effectively created for prime broker deals, that is deals made by the prime broker institution that are initiated, or made on behalf of, a third party.

Figure 1:
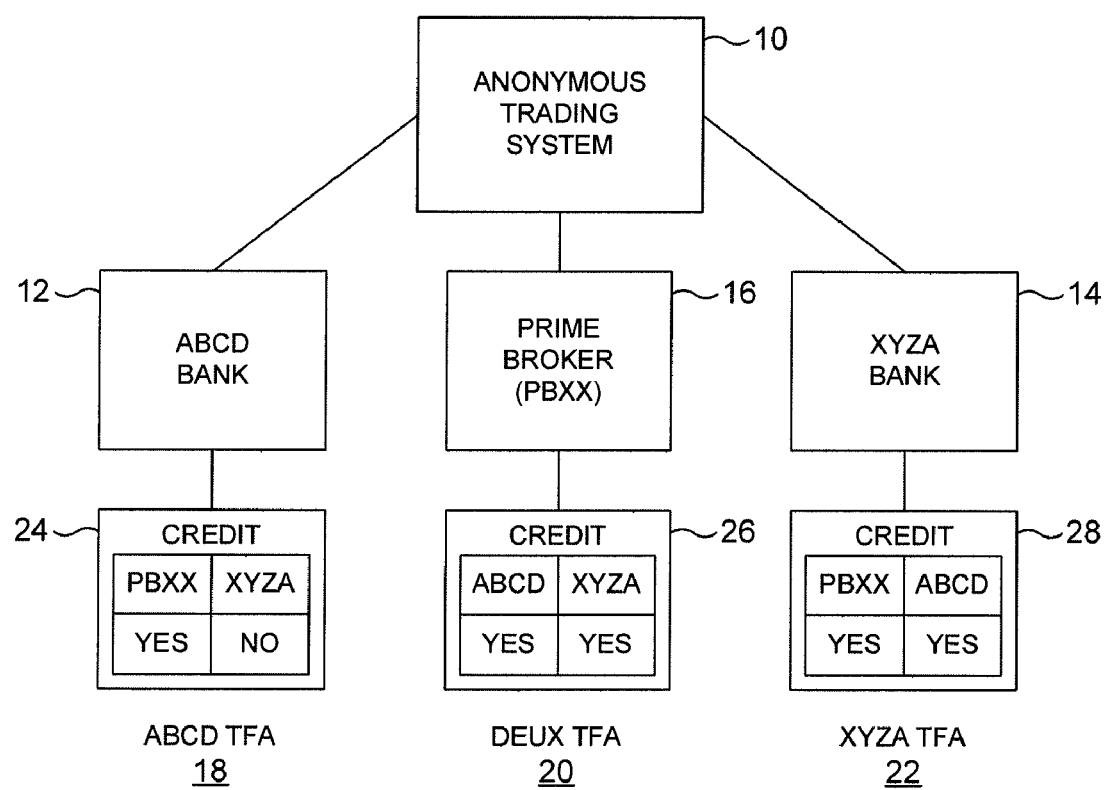
FIG. 1 is a schematic diagram showing a prime broker deal code in an anonymous trading system.

FIG. 1 illustrates an anonymous trading system generally at 10. This may, for example, be one of the systems disclosed in U.S. Pat. No. 5,375,055. Alternatively, any other anonymous trading system may be used, for example, that of EP-A-399850. In the example to be described, the instrument being traded is FX Spot. However, any other fungible, including financial and non-financial instruments may be traded on a system embodying the invention.

Although described with respect to an anonymous trading system, the system need not be anonymous.

Whatever the nature of the trading system it is to be understood that it is a computerised system which matches and trades quotes automatically without human intervention beyond the inputting of quotes into the system by a trader. Even this trader input is not necessarily essential as systems have been developed which allow automatic generation of quotes. These are referred to as automatic trading interfaces and are disclosed in our co-pending application U.S. Ser. No. 10/205,535, the contents of which are incorporated herein by reference.

The following description includes discussion of the message flows in various embodiments of the invention. It is to be understood that these messages are all, in nature, electronic messages sent between computers across a telecommunications network. The exact nature of these messages will depend on the telecommunications standard adopted.

For example, the network may be a private communications network or it may be a public network such as the Internet in which case a TCP/IP standard may be used for message transfer.

It follows that the various physical elements described in the following embodiments represent computers. Reference is made to known anonymous trading systems such as that widely used in the FX Spot trading market and provided by EBS Dealing Resources. Other examples are the Dealing 2000/2 and 3000 systems provided by Reuters PLC. The architecture and functionality of these systems is well know to those skilled in the art.

In the general discussion of the figures, reference is made to banks, a prime broker and a back office system. The banks and the prime broker are to be understood as bank node computers under the control of a given bank. These are well known, for example from the EBS system and U.S. Pat. No. 5,379,055 referred to above, however, their functionality and the messages they receive, construct, process and send are changed in the manner described below. In an alternative architecture, such as one based on a network of braking nodes as disclosed in GB-A-2363876 they form a part of the broking node computers.

Similarly, the trader terminals may be conventional computer workstations which provide a display of the market to traders and permit traders to enter quotes into the system, for example by means of a keypad. In one embodiment, this display is modified to show two market displays, one available through a conventional trading route and are via a prime broker. As mentioned above, quotes could be input automatically by an automated trading interface which generates quotes in response to predetermined changes in market conditions.

A number of bank trading floors are connected to the trading system to enable traders at trader terminals on the trading floors to trade with counter-parties via the trading system. Each trading floor has a unique deal code, usually a four character code which identifies the floor to other traders on the system. An institution may have a number of trading floors which could be located in different countries or cities. In practice, many trading floors are connected to the trading system 10. For convenience, the example of FIG. 1 shows three trading floors: Bank ABCD 12, Bank XYZA 14 and Prime Broker PBXX 16. All trading floors on the system assign credit limits to all the other trading floors on the system which whom they wish to deal. The credit limits dictate the amount of trading that is possible between counter-parties. The trading floors also assign credit to the prime broker deal code. That deal code also assigns credit to the other counter-parties. The prime broker is a deal code that is set up to allow third party clients of the prime broker institution to trade using the institution's credit. It is not a physical trading floor as such. As it has its own deal code, counter-parties will see that they have traded with a prime broker but will not be aware of the client of the prime broker who was responsible for the trade. This is important as that client may be a party with which the counter-party has refused credit or would not ordinarily deal with except at an unfavourable rate. As discussed below, a prime broker deal code is not essential but is advantageous. Prime broker deals may be conducted through a conventional deal code used for regular trades by the bank or institution.

Thus, in FIG. 1, the trading floor administrator 18 at bank ABCD assigns credit to the trading floor PBXX but does not assign credit to trading floor XYZA, as shown at 24. In contrast, trading floor XYZA at 28 assigns credit to both trading floors PBXX and ABCD. As bilateral credit does not exist between ABCD and XYZA the two parties cannot trade with each other on the conventional EBS or Reuters systems referred to above as bilateral credit is required for a deal to proceed. Quotes entered into the system by trading floor ABCD will not be seen by trading floor XYZA as the credit filter will exclude those quotes from the market view made available to the traders on the XYZA trading floor. The market view only shows those quotes from trading floors with which there is credit. Thus, trading floor XYZA is excluded from dealing with trading floor ABCD. If floor ABCD is putting the best quotes in the market into the system, floor XYZA will miss out on the opportunity to deal at those prices.

The prime broker deal code PBXX also assigns credit to all the trading floors on the system. As shown at 26, the prime broker floor assigns credit both to the ABCD trading floor and the XYZA trading floor. Thus the prime broker deal code PBXX can deal with both the ABCD and XYZA trading floors.

Figure 2:
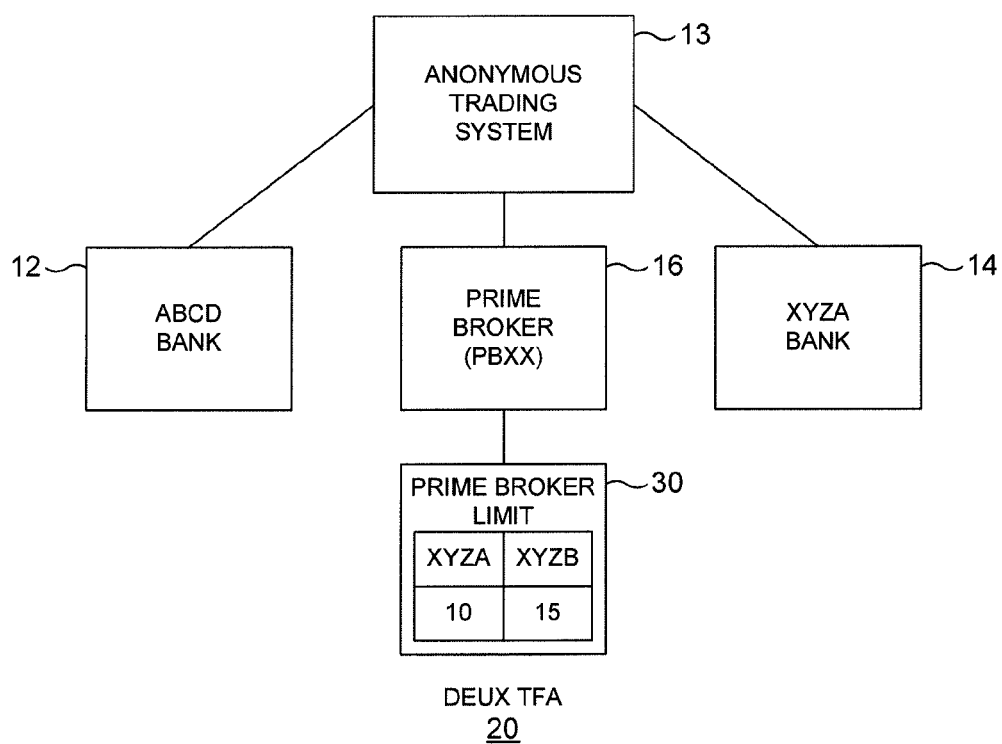
FIG. 2 shows how the prime broker assigns trading limits to each client institution.

Referring to FIG. 2, the prime broker trading floor administrator 20 also assigns trading limits for each prime broker client. These limits define the extent to which a client can trade using the prime broker's credit and appear to the rest of the trading floors as the prime broker trading floor. They also indicate for which deal codes on the system it is willing to act as a prime broker. If no credit is assigned, the prime broker is not willing to act as a prime broker for that party. These trading limits are typically daily limits. Thus, at 30 the prime broker Trading Floor Administrator (TFA) 20 assigns limits of $10M (million) to trading floor XYZA and $15M to trading floor XYZB. If the credit falls below a defined minimum threshold the client will not be able to view prime broker prices. The credit limits and the authority to trade may be submitted to the trading system depending on the architecture of the system and, in particular, where credit limits are stored on the system.

Preferably credit is netted. Credit netting in an anonymous trading system is described in our co-pending application Ser. No. 09/898,305 the contents of which are incorporated herein by reference.

The prime broker bank will set up credit for each prime broker client through the TFA workstation 30. The prime broker bank will have a total pool of credit for each counterparty and part of that credit will be allocated to the prime broker clients. The remainder will be reserved for the prime broker bank's regular trades where it does not act as a prime broker.

In a netting credit model, a buy and sell are treated as having a positive and negative effect respectively on the credit limit. Thus, a prime broker client bank can approach their credit limits from both the positive and negative sides. If a client bank has reached their credit limit on one side, they may still place orders on the other side. Thus, if the client has a credit limit of $30M with the prime broker and reaches that limit on the buy side, he may continue to sell as those trades have the effect of lowering the credit. Once a sell transaction has been completed, the client will be able to buy again up to the value of the sell transaction whereupon the credit limit will be hit again.

Figure 3:
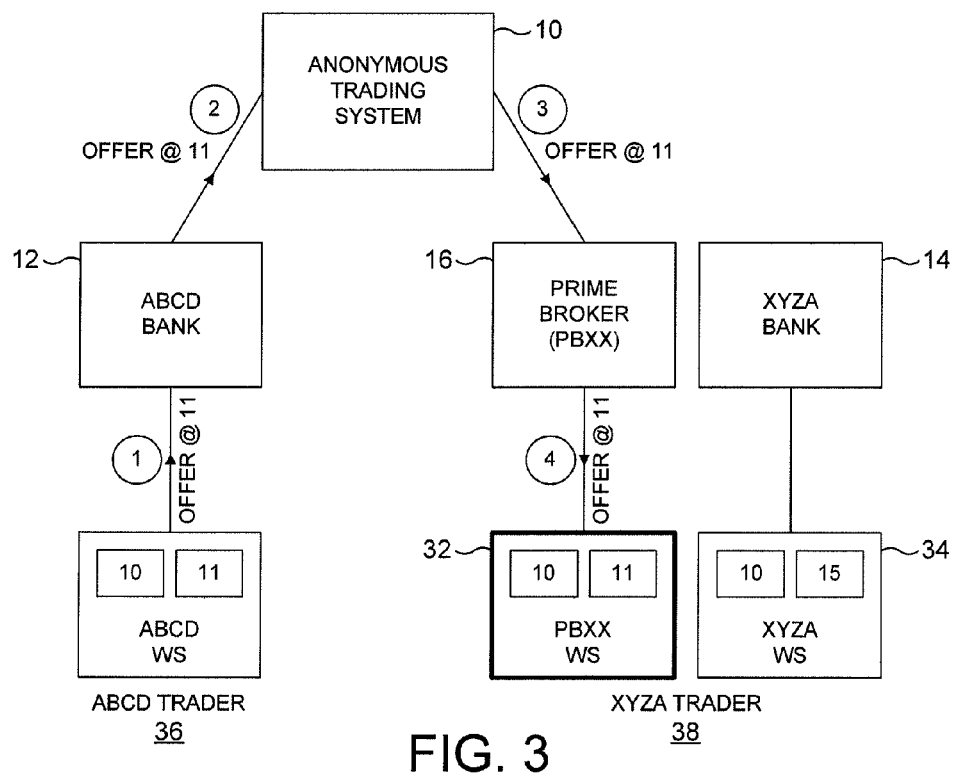
FIG. 3 shows how the prime broker client can deal a quote through the prime broker that is not available to it in its own right.

Referring now to FIG. 3, each of the prime broker clients has a trader terminal that is the prime broker institution's terminal. When a trader at the client trading floor logs on to that terminal, he logs on as a trader on the prime broker institution's prime broker deal code. The prime broker terminal may be a physically separate terminal or may be accessed by using a separate login routine at a common terminal that is also used by the trader for trading activities in the name of his institution.

In the example of FIG. 3, the terminal is physically different and the prime broker client has a prime broker terminal 32 displaying a first market price and his own institution's terminal 34 displaying a second market price. A trader 36 at trading floor ABCD submits an offer at 11. The trader 38 at trading floor XYZA does not see this offer at his own terminal 34 as his trading floor does not have credit with trading floor ABCD. His terminal shows 15 as the best offer in the market. However, his prime broker terminal shows the offer at 11 as the prime broker institution has credit with trading floor ABCD. In this example it should be understood that the prices given are the 'pips' or least significant digits of the price. The display on the trader terminal 34 might represent, for example, an opportunity to buy Euros at $1.1011 and to sell them at $1.1015, where the currency pair being traded is Euro:US Dollar.

Figure 4:
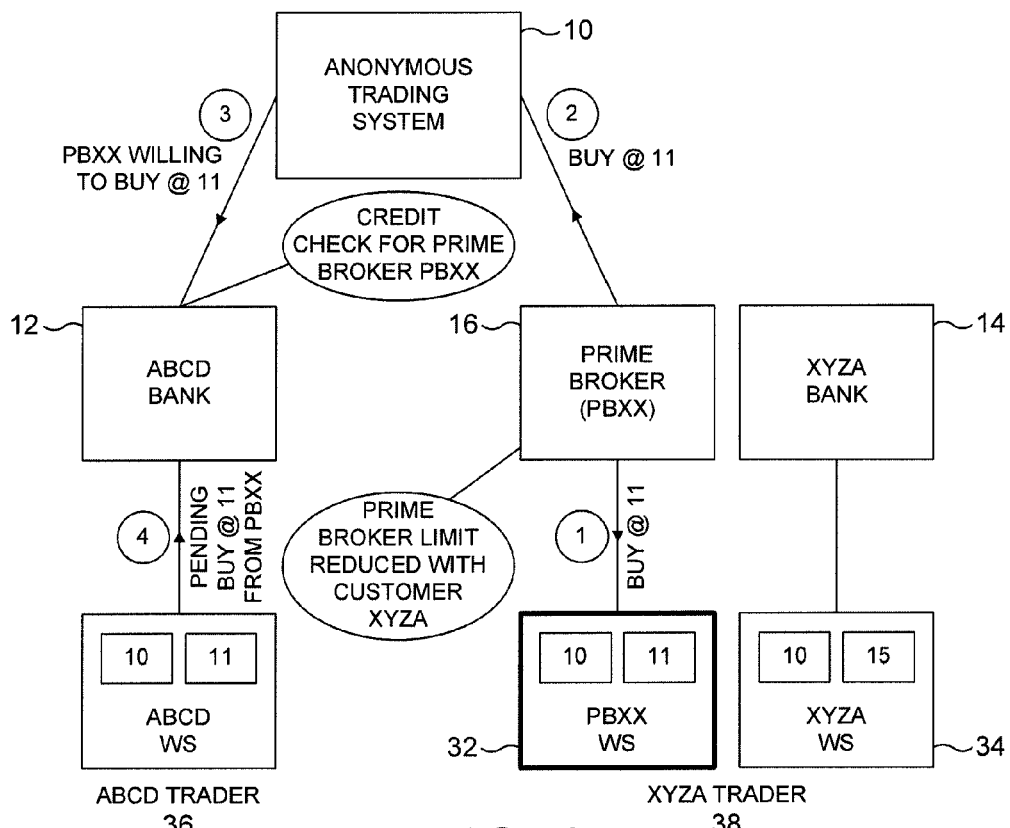
FIG. 4 illustrates how the prime broker executes a second deal with the client institution after completion of a deal instigated by the client.

Referring now to FIG. 4, the trader 38 at institution XYZA hits the offer at 11 using the prime broker terminal or workstation 32. The offer at 11 will be for an amount, for example 1 million, and the prime broker 16 will reserve this amount from the credit it extends to trading floor XYZA. The credit is not changed at this point as the deal has not been completed. The hit is communicated through the trading system to the trader 36 at trading floor who sees a pending buy from deal code PBXX. Trader 36 is aware that PBXX is a prime broker deal code and so knows that the hit has come from a client of the prime broker institution. However, the trader 36 cannot find out the identity of that client. At the trader's bank ABCD, or within the trading system 10 depending on the architecture of the system, a credit check is carried out to determine whether there is sufficient credit to complete the hit order. However, it is the bilateral credit between ABCD and PBXX that is checked. The credit between ABCD and XYZA is irrelevant.

Figure 5:
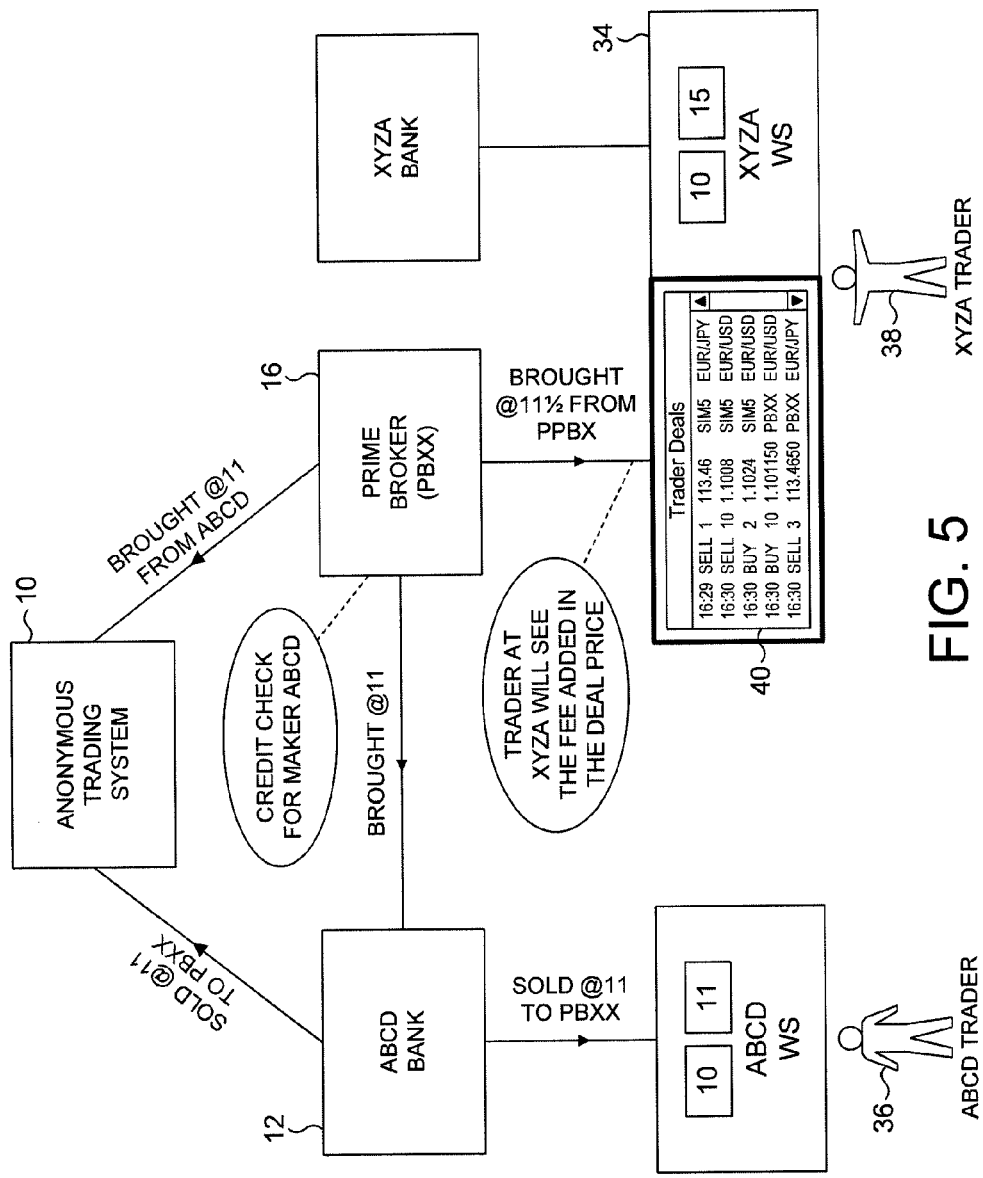
FIG. 5 illustrates how the deal of FIG. 4 is displayed at the client institution terminal.

Once the deal between ABCD and PBXX has been completed, a complementary deal is completed between PBXX and the client XYZA. In return for allowing XYZA to utilise its credit, the prime broker institution charges XYZA a fee. This fee may be on a per transaction basis and can be levied in a number of ways. First it could be charged to XYZA completely separately from the deal between PBXX and XYZA. For example a monthly invoice could be sent detailing all the transactions for which PBXX has acted as a prime broker. Alternatively, the fee could be incorporated into the deal between XYZA and PBXX. In FIG. 5 the fee is added into the deal price so that a deal display panel at the prime broker workstation 32, which shows all deals conducted by XYZA through the prime broker shows the deal with the fee added into the deal price. In FIG. 5, the deal at 11 is shown as the final BUY deal 40 on the fourth line of the display. Although the deal between the prime broker PBXX and ABCD was at 11, the deal between PBXX and the client XYZA is at 11.5 with the additional 0.5 representing the prime broker's fee. The deal is shown at 11.5 in the trader's deal display panel. Alternatively, the deal between PBXX and XYZA could be completed at the same price as the deal between ABCD and PBXX, but the price shown to XYZA could incorporate the prime broker fee. Other mechanisms for charging the broking fee are possible and will occur to those skilled in the art.

As shown in FIG. 5 the deal completion process between PBXX and ABCD requires a further credit check to be made at PBXX to check that there is credit between PBXX and ABCD. As each side assigns its own credit limits, it is possible for PBXX to have credit with ABCD but not vice versa. Assuming that the credit exists, the deal is completed and a message is sent to the trading system 10 by both parties, with ABCD advising the system that it has sold an amount at 11 to PBXX and PBXX advising the system that it has bought an amount at 11 from ABCD. The deal completion message is sent to ABCD and then communicated to the trader's workstation where it can be seen in the trader's completed deal panel which identifies PBXX as the counter-party.

Figure 6:
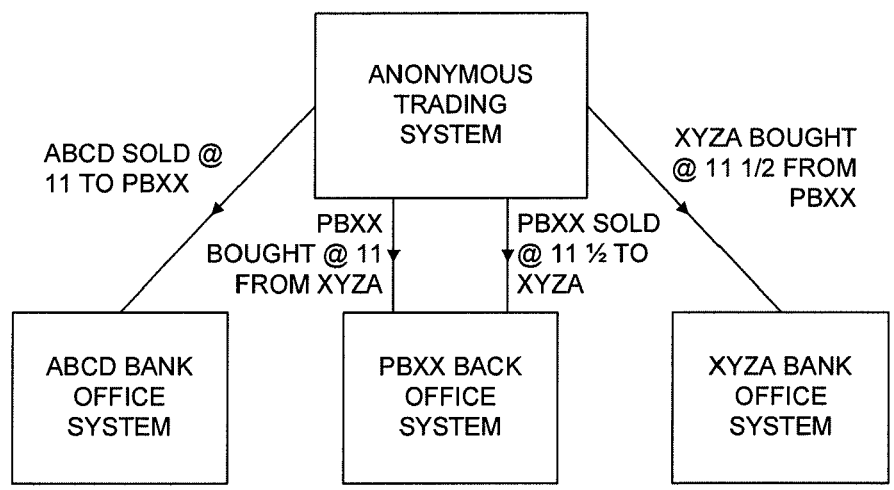
FIG. 6 illustrates how a trade conducted via a prime broker results in four deal tickets.

As part of any deal on the anonymous trading system 10, when a deal is completed, a deal ticket is issued to each side of the deal. FIG. 6 shows how a deal conducted through a prime broker results in 4 deal tickets being issued. A first ticket 42 is issued to the ABCD back office system 44 confirming that ABCD sold at 11 to PBXX. A second ticket 46 is issued to the PBXX back office system 50 confirming that PBXX bought at 11 from ABCD. The system 10 issues a third ticket 52 to the PBXX back office system 50 confirming that PBXX sold at 11.5 to XYZA and a fourth ticket 54 which is sent direct to the XYZA back office system 56 if bank XYZA has a deal feed client installed confirming that XYZA bought at 11.5 from PBXX.

Figure 7:
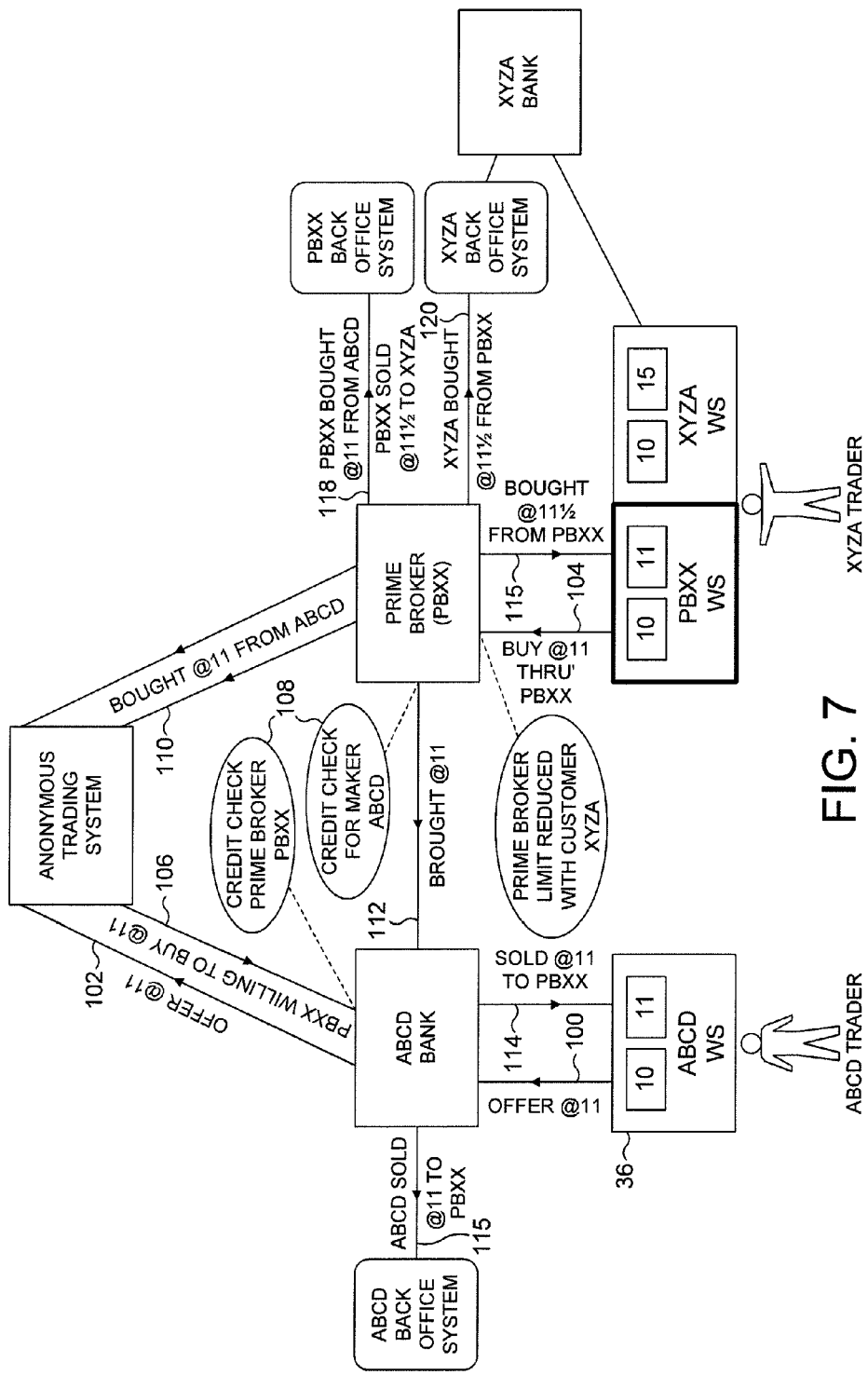
FIG. 7 is a schematic overview of the entire deal process.

FIG. 7 illustrates the complete order cycle for the deal that has been described. At step 100 the trader 36 at institution ABCD submits an offer to sell at 11 into the trading system. This offer is passed from, for example, the ABCD bank, or market access node if the anonymous trading system is that described in U.S. Pat. No. 5,375,055, into the anonymous trading system market distributor and arbitrator at step 102. The market distributor performs the function of distributing quotes in the market to traders and assembling market views for each trading floor based on a credit matrix detailing the parties with which that trading floor has credit. The arbitrator includes a matching engine and matches quotes to enable deal execution. In some trading systems, these functions of market distribution and matching are performed by separate computers at separate locations. In other systems they are combined. At step 104 the XYZA trader, trading through the prime broker terminal, hits the offer to sell and this hit is communicated to the system at 105 as a request to buy from dealing floor PBXX. At the same time, the trading floor PBXX reserves the deal amount against the credit XYZA has to deal through PBXX as a prime broker. This credit adjustment is made final when the deal has been completed. The system at 106 communicates this order as a willingness to buy to the trader terminal at ABCD. Both sides then perform a credit check at 108 to ensure that there is sufficient bilateral credit between ABCD and PBXX to fulfil the order. Once credit has been established, prime broker PBXX notifies the system at 110 of the deal with a message 'Bought at 11 from ABCD'. It also notifies ABCD at 112 that the deal has been completed. At 114 ABCD passes on the notification to the trader terminal in a message 'Sold at 11 to PBXX'. A second deal for the same amount at 11.5 is concluded between PBXX and the client bank XYZA and a message 115 sent to the prime broker terminal 32 at bank XYZA stating 'Bought at 11.5 from PBXX. This message is displayed in the completed deals panel of that workstation. At 116 a deal ticket is sent to the ABCD back office system stating that ABCD sold at 11 to PBXX. At 118 two deal tickets are sent from the prime broker 16 to the DEFX Back Office system stating that PBXX bought at 11 from ABCD and sold at 11.5 to XYZA. Finally at 120, a deal ticket is sent to the XYZA Back Office system stating that XYZA bought from PBXX at 11.5 .

The system described above has the advantage that institutions with limited credit are given access to better prices by utilising the credit of other institutions. In return, the institutions who allow their credit to be used gain financially for each trade that is conducted in their name. The anonymous trading system benefits as more orders are entered into the systems so increasing the liquidity in the currency pairs being traded. The system described has the further advantage that large trades may be conducted through a prime broker without the identity of the trading party being revealed to the market. In prior art systems, orders are typically for amounts in the range of $1M to $5M. If a trader wants to trade a very large amount such as $50M, the order will not be filled by a single trade but by a number of trades. Although the system is anonymous, other traders on the system can see the identity of the parties to all completed deals. They can therefore see that there is a series of deals having the same party on one side. They conclude that there must be a large order that needs to be dealt and will adjust their prices on the assumption that the party dealing will be prepared to pay a higher price to complete the order. The system described above avoids that possibility. The other traders will see a string of deals having the prime broker on one side. However, they will know that the prime broker is acting for many clients and they will not be able to tell that all the deals originate from a single client.

Figure 8:
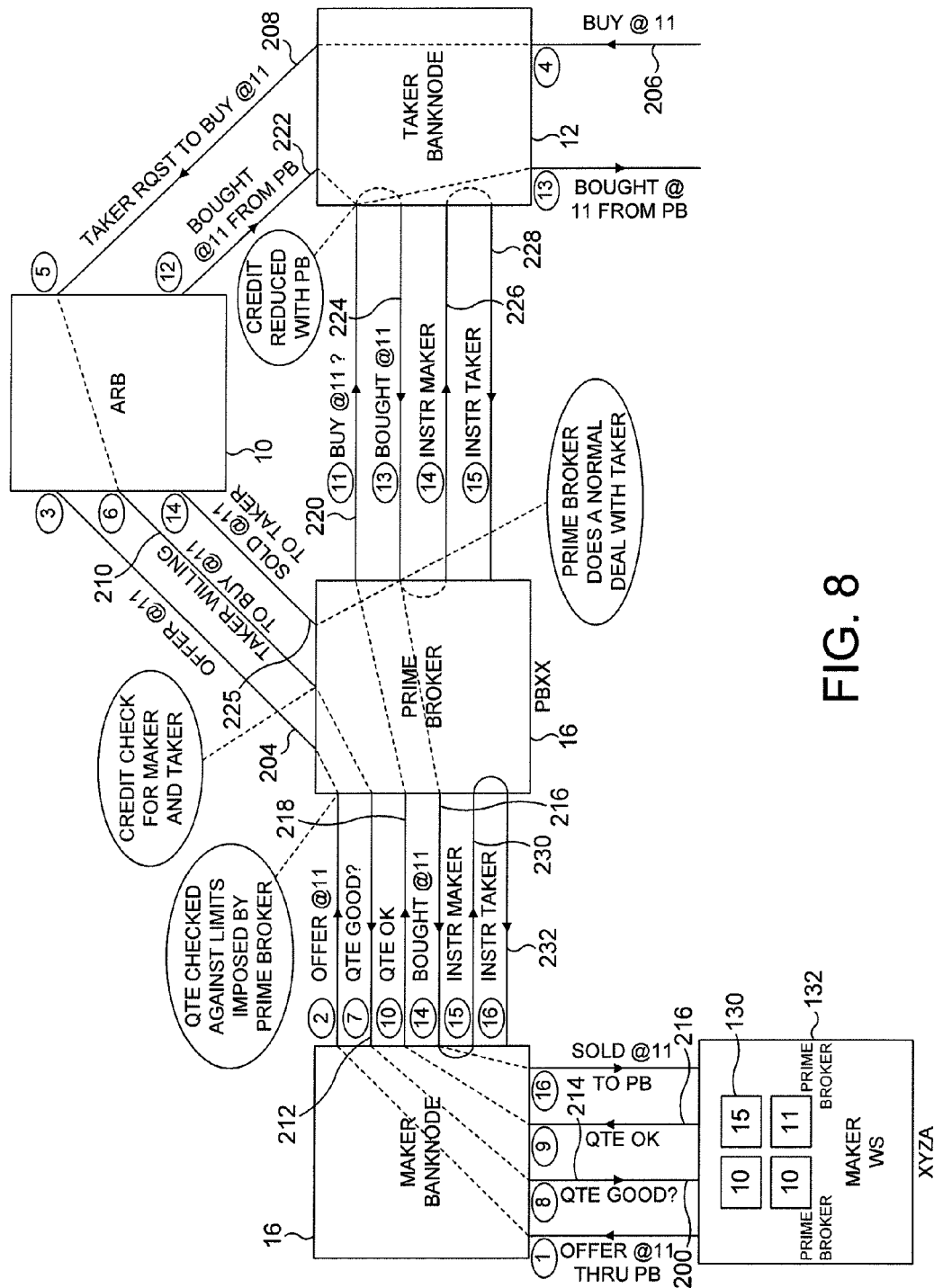
FIG. 8 is a more detailed view of the deal process executed on a first trading system architecture where the quote is submitted through the prime broker.
Figure 9:
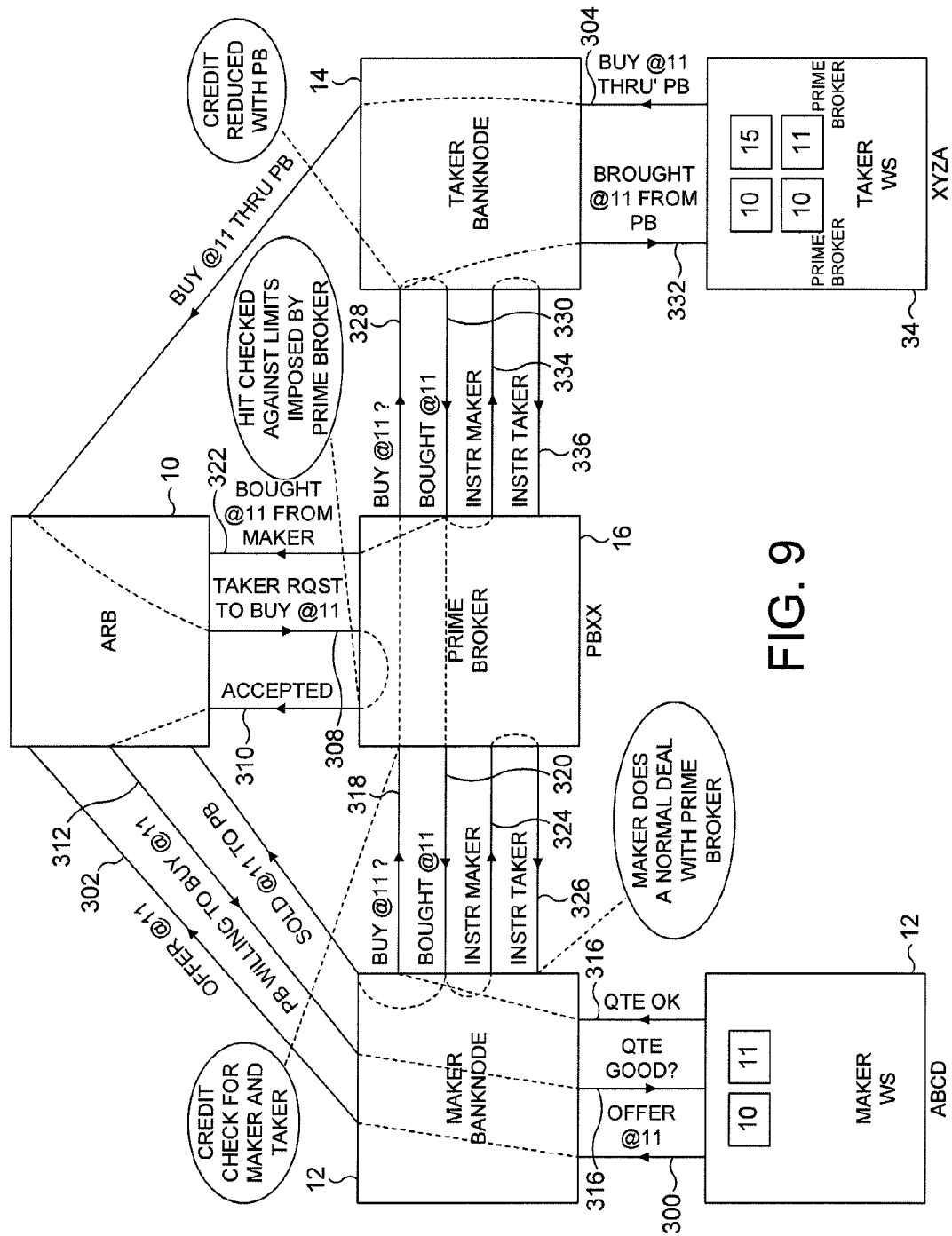
FIG. 9 is a similar view to FIG. 8 where a quote is hit through the prime broker.
Figure 10:
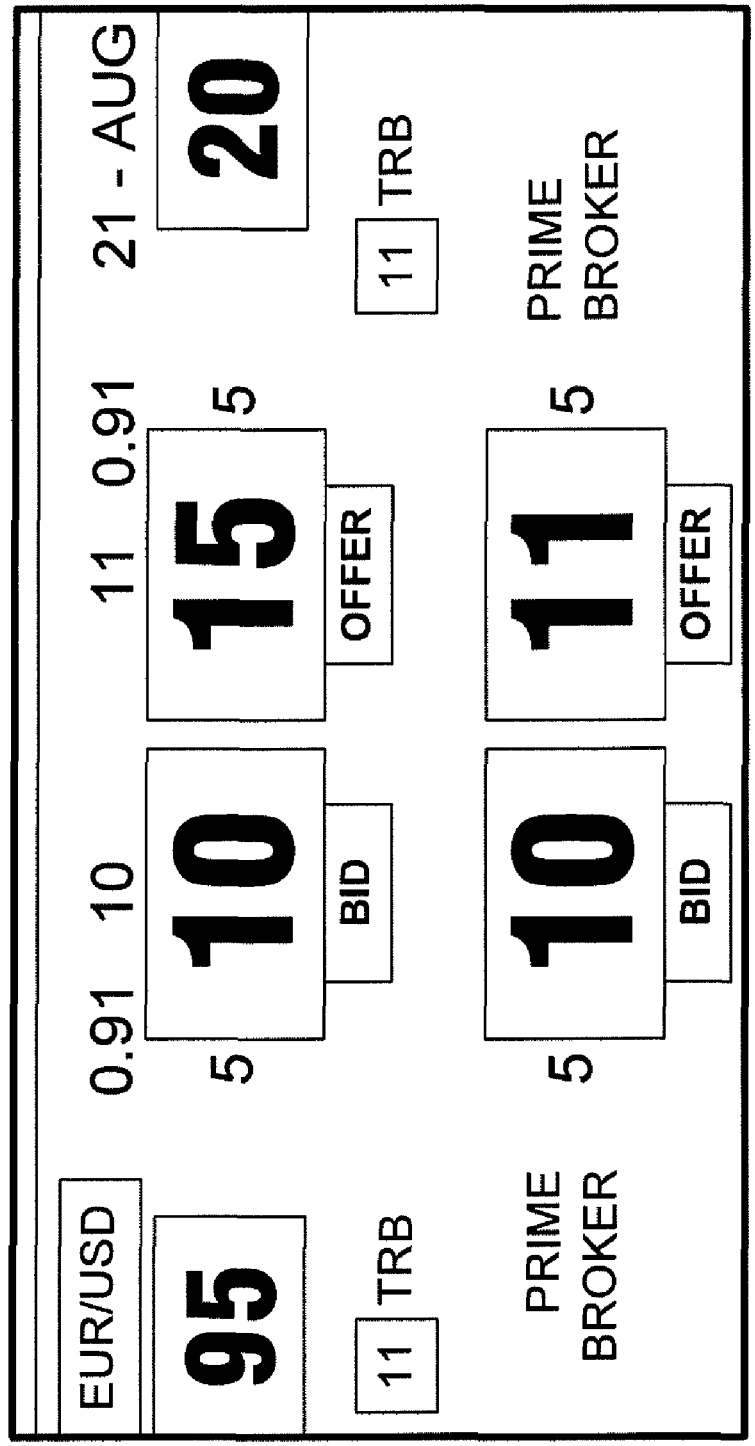
FIG. 10 shows a first client screen display.
Figure 11:
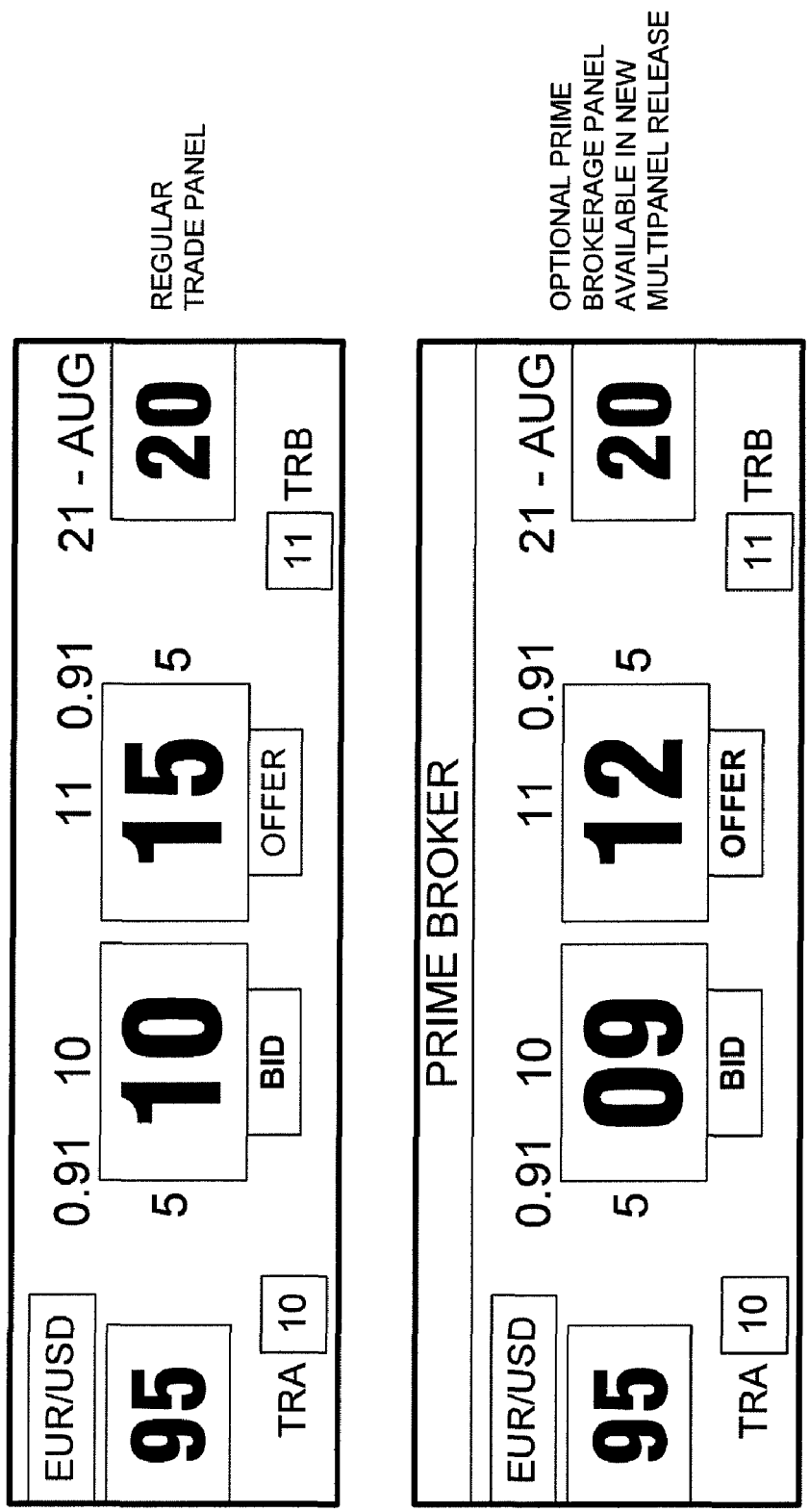
FIG. 11 shows a second client screen display.

The message flow in the example above has been simplified for the sake of clarity. FIGS. 8 and 9 show the complete message flow during the submission and hitting of quotes respectively. The system shown in FIGS. 8 and 9 differs from that of FIGS. 1 to 7 in that there is not a separate prime broker terminal at the client bank XYZA. Instead, the option to trade through the prime broker is presented within the same trading screen display that the trader uses to trade on behalf of bank XYZA. In the FIG. 8 example the trader's display has two parts. The first part, 130 shows the best bid and offer prices that the trader can get trading as XYZA. The second part 132 shows the best prices available by trading via the prime broker. This arrangement is convenient as the trader does not have to watch two screens but can easily see which of the two available routes will give him the best price. If the prices are the same he will trade as his own bank to avoid paying a prime broker fee. This display is shown in more detail in FIG. 10 and a variant is shown in FIG. 11. Both will be described in greater detail below.

In the example of FIG. 8, in contrast to that of the previous figures, the XYZA trader, trading via the prime broker is the market maker. The trader puts an offer to sell at 11 into the market through the prime broker at step 200. The trader can choose if the offer is submitted in his own name or in the name of the prime broker. If the quote is submitted in the trader's own name, that is XYZA, then the trading system will match the quote with other quotes in the market using XYZA's credit first and will then use the prime broker's credit in cases of intentional automatch. Any amount left over is made available to other counter-parties in the trader's name. If the quote is submitted in the prime broker's name, the trading system will also match the quote with other quotes in the market using XYZA's credit first and will then use the prime broker's credit in cases of intentional automatch. However, any amount left over is made available to other counter-parties in the prime broker's name. Regardless of the name in which the quote is submitted, the trader always retains control over the quote and has the ability to interrupt the quote instantly to withdraw it from the market.

Within the trading system, matching of the quote is performed on the basis of price, credit and time priority. Referring back to FIG. 8, the example to be described assumes that the matching is made using the prime broker's credit. The quote entered by the maker is sent to the prime broker 16 at step 202 which checks the amount of the quote against the credit limit for trades conducted via the prime broker. From the perspective of the rest of the system, the prime broker 16 now owns this quote. At step 204 the quote is sent to the arbitrator within the trading system whereupon the trading system distributes the quote making it visible to other traders who have credit with the prime broker trading floor. At 206, the trader at bank ABCD 14 hits the quote, submitting an order to buy at 11. This order is passed to the arbitrator at 208 and sent to the prime broker at step 210. At this point credit checks are performed for the taker and the maker. The next four steps verify that the quote is good, that is that the maker wishes the quote to remain in the market and be dealt. At 212, the prime broker sends a 'Quote Good?' Message to the maker bank node and at step 214, the maker bank node sends a 'Quote Good?' message to the maker workstation. The workstation replies with a 'Quote OK' message 216 verifying that the quote is good and is to be dealt. This message is sent to the maker bank node which then sends a 'Quote OK' message 218 to the prime broker.

At steps 220 to 230, the system executes a deal between the prime broker and the taker in a conventional manner. Thus at 220 the prime broker sends a 'Buy at 11?' message to the taker bank node. The taker bank node at 222 sends a 'Bought at 11' message to the arbitrator and at 224 sends the same 'Bought at 11' message to the prime broker. At 225 a 'Sold at 11 to taker' message is sent from the prime broker to the arbitrator 10. At 226 an 'InstrMaker' is sent from the prime broker to the taker and at 228 an 'InstrTaker message is sent from the taker to the prime broker. These two messages complete the deal and inform the parties that the deal has been completed.

A deal also needs to be concluded between the prime broker and the maker. In this example the deal is concluded at the same price as the deal between the prime broker and the taker. The 'Bought at 11' message is also sent from the prime broker to the maker bank node and an 'InstrMaker' message sent from the maker bank node to the prime broker followed by an 'InstrTaker' message from the prime broker to the maker bank node. The deal is now complete and the deal tickets sent in electronic message form to the back office computer systems at the maker, taker and prime broker to allow logging and settlement of the deals by the back office computer systems.

Referring to FIG. 9, the situation where a hit is submitted into the system is shown in more detail. This is an expanded version of the process shown in FIG. 7. Hits or takes submitted through the prime broker are also matched in price, credit and time priority and the taker's credit will always be used first if it exists. If the taker does not have credit the prime broker's credit will be used. As in the example above, where the prime broker's credit is used, two deals are done, one between the prime broker and the counter-party and one between the prime broker and the client. Again the maker, who is the counter-party to the prime broker never knows the identity of the taker trading through the prime broker.

The message flow is shown in FIG. 9. At step 300 the maker ABCD 12 submits a quote into the system offering to sell at 11. At step 302 this offer is communicated to the arbitrator whereupon it is distributed to the market. The trader at bank XYZA 34 will not see this quote in his regular display as he does not have credit with the maker bank ABCD. However he will see it in his prime broker display as the prime broker has credit with the maker bank. At step 304, the taker trader hits the quote through the prime broker, sending a message 'Buy at 11 through prime broker' to the taker bank node 14 which in turn sends a message 'Taker request to buy at 11 through prime broker' to the arbitrator at step 306. The arbitrator, on receiving the hit, tries to match it using the taker's credit first. If no credit exists or a better price quote can be matched based on the prime broker's credit the arbitrator selects the prime broker and, at step 308, the arbitrator 10 forwards the 'taker request to buy at 11 through prime broker' message to the prime broker 16 which accepts the request at step 310 after checking that the deal amount does not exceed the taker's credit with the prime broker. The arbitrator then sends, at 312, a 'prime broker willing to buy at 11' message to the maker bank node 12 which sends a 'quote good' message to the trader workstation at step 314 to check that the trader still wants to trade. If the trader wishes to continue he replies with a 'quote OK' message to the bank node at 316. The deal is now completed in conventional manner with a 'Buy at 11' message 318 being sent from the maker to the prime broker, credit checks being made for both the maker and the prime broker and a 'bought at 11' message 320 being sent from the prime broker to the maker with a 'Bought at 11 from maker' message 322 being sent by the prime broker to the arbitrator. This is followed by an exchange of 'InstrMaker' and 'InstrTaker' messages 324, 326 between the maker and the prime broker. The second deal between the prime broker and the taker is then concluded with a 'Buy at 11?' Message 328 being sent by the prime broker to the taker and a reply message 'Bought at 11' 330 being returned by the taker to the prime broker. At this point the taker's credit with the prime broker is reduced, the amount having already been reserved when the prime broker originally accepted the request to buy on behalf of the taker. The taker also sends a message 'Bought at 11 from prime broker' to the taker workstation at 332 and exchanges 'InstrMaker' and 'InstrTaker' messages 334, 336 with the prime broker. Following completion of the deals, deal ticket will be produced for the maker, the taker and the prime broker as discussed above.

As mentioned above, the trading rules require that orders are matched on the basis of price, credit, and time. In a preferred embodiment of the invention there is one situation where this rule is not observed. The order matching is modified to allow a floor within a prime broker bank institution to jump the queue of one if their prime broker customers attempts to hit a bid or pay an offer which is at the same price as a bid or offer they have in the market. If the offer is stacked with more than one counterparty, and the prime broker bank is not the first on the list, the prime broker bank is automatically pronounced to be first on the list and is then executed against the prime broker client as a regular deal with no prime brokerage fee.

In the example of FIG. 3 to 6, the client bank XYZA has a dedicated prime broker terminal in addition to its usual trading terminal. In the example of FIGS. 8 and 9, the trader has a single terminal which displays both the regular best prices that can be obtained using its bank's credit and the best price that can be obtained using a prime broker. Two versions of this display are shown in FIGS. 10 and 11 respectively. In FIG. 10 a single display panel is presented to the trader with the regular prices shown above the prime broker prices. This arrangement is particularly convenient as it allows the trader to see the opportunities for trading through a prime broker easily. The arrangement of FIG. 11 is intended for a multiple panel display in which the regular prices are shown in one panel shown in FIG. 11a and the prices available through a prime broker are available through another panel shown in FIG. 11b. These two panels may be only two of a number of panels that are displayed to the trader. For example a display may comprise regular and prime broker panels for a plurality of currency pairs.

In order that the arbitrator can generate the market views displayed to the trader, it maintains an additional credit vector of bilateral credit between each customer and the prime broker. This credit vector is shared with the marker distributor, or broking node if the market distribution function is provided by a broking node rather than a separate market distributor as disclosed in GB-A-2363875, so that it can generate the market view to be displayed in the prime broker price panel.

In the examples described above, the assumption has been made that there is only a single prime broker. In practice it is likely that a number of banks will want to offer prime broker services as they provide an attractive revenue stream. Thus, as any bank offering prime broker services is likely to have credit with all or nearly all possible counter-parties on the system, a trader wishing to use a prime broker has a choice of possible prime brokers. Thus a decision must be made as to which prime broker to use. This could be specified by a user preference based on, for example, the fee structures charged by the prime broker so ensuring that the minimum fee is paid. Alternatively the decision could be left to the arbitrator. Referring back to the example of FIG. 9, before the arbitrator sends the 'taker request to buy at 11' message 308 it must decide to which prime broker the message is to be sent. This may be done in a number of ways, for example on a round robin basis or on the basis of preference supplied by the taker. Those preferences may be predefined of indicated in the 'taker request to buy through prime broker' message 306. For example this message could be amended to append the deal code of the preferred prime broker.

Where multiple prime brokers are used, both sides of a deal could act through a prime broker. Thus, an institution ABCD could act through prime broker PBXX and an institution XYZA could act through a prime broker DEFX. The actual deal would be concluded between trading floors PBXX and DEFX. Separate deals, in the manner discussed above, would then be concluded between ABCD and PBXX and DEFX and XYZA. This would result in six deal tickets being generated.

At the customer, multiple prime brokers may each have a separate terminal used by the trader to trade through a selected prime broker. However, an alternative approach is to include a price panel at the prime broker client's workstation for each prime broker enabling the client to compare the prices available on-screen. The use of multiple price panels in a single trading screen is known and typically used to allow traders to keep track of several currency pairs simultaneously. The use of multiple trading panels is disclosed in our provisional application U.S. 60/478,570 the contents of which are incorporated by reference.

Alternatively, or additionally, the prime broker codes could have associated voice functionality so that prime broker prices are announced to the client. The use of voice announcements is disclosed in U.S. Pat. No. 5,806,050.

An alternative to multiple price panels is to display a blended prime broker rate, whereby the prime broker client sees only the best prime broker rate. This requires the market distribution functionality to store details of the prime brokers with which a given client operates and to assemble a best prime broker view for distribution to the client. Both of these last two options have the advantage of requiring only a single prime broker terminal at the customer. This functionality could be provided on a single screen in addition to the traders own direct trading prices. A further alternative arrangement provides a blended price showing the best rate that this available either through a prime broker or through direct dealing. It is preferred that the direct price is shown if the prices are equal as direct trading does not incur prime brokerage fees.

In one preferred embodiment, the prime broker bank may view the deals being made by prime broker customers. A conventional trader display includes a Trader Deals panel which lists the deals done by that trader. In the preferred embodiment a similar panel is available at the prime broker bank which lists active orders with sizes for prime broker customers. The prime broker bank terminal can select whether or not to display this panel. The panel may include only done deals or may include outstanding quotes in the market as well. It is preferred that the identity of the prime broker customer is not displayed.

The ability may be given to prime broker customers to permission individually whether prime broker banks can see their orders on the prime broker customer orders panel. Similarly, the prime broker banks may permission whether they can see the prime broker customer orders panel on a per customer basis. It is important that no prime broker customer can see the identity of other customers of the same prime broker bank.

Figure 12:
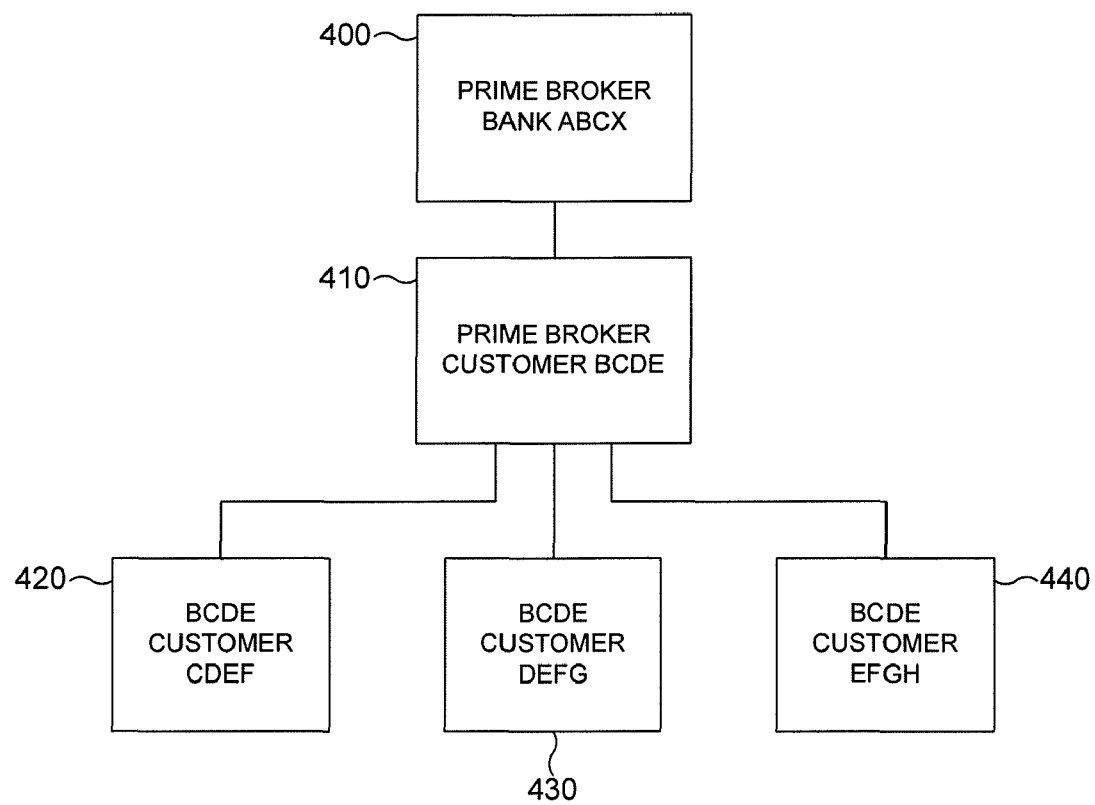
FIG. 12 illustrates a further embodiment of the invention.

In one modification of the embodiments described, prime broker customers are able to white label their prime broker prices to other banks. This is illustrated in FIG. 12. A prime broker bank ABCX 400 has a credit relationship with bank BCDE 410 enabling bank BCDE to trade as a prime broker customer of bank ABCX. The prime broker customer BCDE has its own credit relationship with a number of its own customers CDEF 420, DEFG 430 and EFGH 440. The prime broker customer BCDE will apply a spread to the prices it shows to its customers 420, 430 and 440 and for a price to be hit, there will be three separate deals and six deal tickets. The first deal is between the prime broker bank and the counterparty. The second is between the prime broker bank ABCX and its customer BCDE and the third is between the customer BCDE and one of its customers 420, 430, 440.

As far as the prime broker bank is concerned, its only exposure to risk is with the counterparty bank and its customer BCDE 410. In other words, there is no additional risk. To the prime broker customer, there is the same advantage as in the previous embodiments together with the ability to offer prices to its own customers and profit from the spread applied. To the customer's customers 420, 430, 440 the advantage is that they have access to liquidity and prices that would otherwise be unavailable to them.

Although not shown in FIG. 12, it would be possible for the customers CDEF 420, DEFG 430 and EFGH 440 themselves to enter into credit relationships and offer the prices they receive to customers subject to applying a spread.

In the embodiment described, it has been assumed that the prime broker customers are banks or similar financial institutions. This is not necessarily the case. In one embodiment of the invention, the customers comprise one or more hedge funds. The nature of hedge funds imposes some requirements on the system.

Hedge funds require that most of their positions are broken out into multiple funds breakout. To facilitate such a trade, a prime broker customer must be able to load a list of all accounts into the trading system. This enables the customer to link the account and the amount on a post deal basis. The prime broker bank is provided with a pre-deal interface to acknowledge that the prime broker bank understands the breakout name. The prime broker bank may need to amend the name to match its own internal systems. This is conveniently done via a mapping table.

Thus, where the customer is a hedge fund, they can enter the list of funds into the trading system. This is conveniently performed by the trading floor administrator terminal into which the finds information is loaded. The funds information is also passed to the prime broker bank for mapping of the funds information to the bank's back office codes.

Once deals have been completed, deal tickets are provided via a deal feed interface or, where used, an automated trading interface. A hedge fund prime broker customer must be able to select a deal reported from either of these sources and break it out into several sub-accounts. The deal passed through the deal feel or ASI is effectively a series of linked deals enabling them to be property allocated into the correct accounts.

Many modifications to the embodiments described are possible and will occur to those skilled in the art without departing from the scope of the invention. For example, the use of a separate deal code for a prime broker, although convenient, is not essential. A prime broker deal may be made through any regular trading floor of the prime broker institution. It is also not essential to show the prime broker and direct prices separately at the trader's workstation. It is possible to combine these together so that the trader is simply shown the best price they can obtain either by trading in their own right or through a prime broker. In such an environment the system will be arranged such that a trade will always be made in the name of the client bank if credit exists, as this avoids the client bank having to pay a fee to a broker. In this situation, the arbitrator will maintain an additional credit vector of bilateral credit between each client and the set of prime brokers. The market view will be generated from this vector together with the bank's own credit vector with the available counter parties.

Although it has been mentioned that the identity of a prime broker client is not given up when a prime broker deal is concluded, the system could be configured so that the identity of the client is displayed, with or without the identity of the prime broker trading floor.

The nature of the trading system is not important. In addition to the two systems mentioned above, both of which are distributed systems, embodiments of the invention may be implemented on a centralised system. Embodiments of the invention may be implemented on systems that use dedicated communications networks to communicate between the various workstations and other elements of the systems. Alternatively, a public network such as the internet may be used. The communications networks used by anonymous trading systems are well understood by those skilled in the art.

It will be appreciated that embodiments of the invention provide advantages to banks or other financial institutions using prime brokers, the prime brokers themselves and the trading system operator. From the point of view of the client bank they are given access to better prices via greater credit in the market, increased probability of execution of orders and tighter prices with which to quote to customers. These give the client banks a better competitive position in the market. From the point of view of the prime brokers, they have access to a greater number of global counter-parties for cross selling, increased market exposure, increased market flow and increased revenues through the fees generated by the prime broker services.

The advantages to the provider of the anonymous trading system include an increase in the liquidity pool which facilitates trades. This is especially important in currency pairs in which there are not many trades and may increase liquidity in a given currency pair to the extent that it becomes attractive to trade the currency on the system. Moreover, by increasing the number of trades performed on the system the system provider increases their own revenues which are typically generated on a per trade basis.

In all the embodiments described, it is preferred that a separate deal code is assigned for prime broker customers. This enables regular deals by the prime broker bank to be separated from customer deals and facilitates the handling and allocation of credit as between prime broker trading floors and prime broker customers. The prime broker deal code need not have any physical existence and does not require a physical presence at the prime broker bank.

In practice it is convenient for the deal code to be administered by a separate TFA terminal at the prime broker bank but this is not essential.

Many other alternatives to the embodiments described are possible and will occur to those skilled in the art without departing from the scope of the invention which is defined by the following claims.

What is claimed is:

1. A computerized method of trading instruments on an anonymous trading system in which a matching engine matches orders submitted by counterparties on the basis of order price and bilateral credit between counterparties, the method comprising:

in the absence of credit between a first and a second party, utilizing the credit of an intermediary party having bilateral credit with both the first and second parties to enable first and second party orders to be matched; and the credit of the intermediary being utilized by executing a trade between the intermediary and the second party and a trade for the same amount between the intermediary and the first party wherein the trade between the intermediary and the second party is conducted using a virtual trading floor unique to trades by the intermediary on behalf of other parties.

2. An anonymous trading system for trading fungible instruments, the system comprising:

a matching engine for matching orders submitted by counterparties on the basis of price and bilateral credit between counterparties; and the matching engine, in the absence of credit between a first and a second party, utilizing the credit of an intermediary party having bilateral credit with both the first and second parties to enable first and second party orders to be matched; the matching engine matching orders identified by a prime broker deal code assigned to trades made on behalf of other parties utilizing the intermediary's credit, with counterparty orders thereby to utilize the intermediaries credit to enable the first party to trade with the second party.

* * * * *